United States Patent
Park et al.

(10) Patent No.: US 9,607,504 B2
(45) Date of Patent: Mar. 28, 2017

(54) APPARATUS AND METHOD FOR REMOTE CONTROL IN A SHORT-RANGE NETWORK, AND SYSTEM SUPPORTING THE SAME

(75) Inventors: Ho-Yeon Park, Seoul (KR); Sung-Oh Hwang, Gyeonggi-do (KR); Bo-Sun Jung, Gyeonggi-do (KR); Jun-Hyung Kim, Gyeonggi-do (KR); Ji-Eun Keum, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1597 days.

(21) Appl. No.: 12/873,638

(22) Filed: Sep. 1, 2010

(65) Prior Publication Data

US 2011/0050449 A1 Mar. 3, 2011

(30) Foreign Application Priority Data

Sep. 1, 2009 (KR) .................. 10-2009-0082237
Oct. 12, 2009 (KR) .................. 10-2009-0096927

(51) Int. Cl.
  *G08B 5/00* (2006.01)
  *G08C 17/00* (2006.01)
  *H04L 12/28* (2006.01)
(52) U.S. Cl.
  CPC ............ *G08C 17/00* (2013.01); *H04L 12/282* (2013.01); *H04L 12/2814* (2013.01);
  (Continued)
(58) Field of Classification Search
  None
  See application file for complete search history.

(56) References Cited

U.S. PATENT DOCUMENTS 5,907,279 A * 5/1999 Bruins et al. ............... 340/506
6,346,934 B1 * 2/2002 Wugofski ................... 345/158
(Continued)

FOREIGN PATENT DOCUMENTS

CN 101276511 10/2008
CN 101480019 7/2009
(Continued)

OTHER PUBLICATIONS

Information Technology—User Interfaces—Universal Remote Console—Part 1: Framework, International Standard, ISO/IEC 24752-1, First Edition, Feb. 15, 2008.
(Continued)

*Primary Examiner* — George Bugg
*Assistant Examiner* — Renee Dorsey
(74) *Attorney, Agent, or Firm* — The Farrell Law Firm, P.C.

(57) ABSTRACT

An apparatus and method for remote control in a short-range network system, and a system supporting the same are provided, in which from a remote device that remotely controls the application execution device using a predetermined Control User Interface (CUI), information about capability of the remote device is collected, a CUI request requesting a CUI to be used for remotely controlling a currently executed application and the information about the capability of the remote device are sent to an application server, a CUI matching the capability of the remote device is received from the application server in response to the CUI request, and the received CUI is sent to the remote device.

21 Claims, 19 Drawing Sheets

(52) U.S. Cl.
CPC ..... *G08C 2201/20* (2013.01); *G08C 2201/21* (2013.01); *G08C 2201/30* (2013.01)

(56) References Cited

U.S. PATENT DOCUMENTS

| | | | |
|---|---|---|---|
| 8,823,485 B2 | 9/2014 | Schmidt et al. | |
| 2004/0070491 A1* | 4/2004 | Huang et al. | 340/10.5 |
| 2004/0236442 A1* | 11/2004 | Maymudes | 700/83 |
| 2006/0242665 A1* | 10/2006 | Knee et al. | 725/38 |
| 2007/0124765 A1* | 5/2007 | Bennett et al. | 725/38 |
| 2008/0005302 A1 | 1/2008 | Speicher et al. | |
| 2008/0174449 A1 | 7/2008 | Schmidt et al. | |
| 2008/0243998 A1 | 10/2008 | Oh et al. | |
| 2009/0210488 A1 | 8/2009 | Lee | |
| 2010/0097530 A1* | 4/2010 | Hasegawa et al. | 348/731 |
| 2010/0201891 A1* | 8/2010 | Laroia et al. | 348/734 |
| 2010/0309389 A1* | 12/2010 | Hicks | 348/734 |
| 2011/0023067 A1* | 1/2011 | Kooman | 725/60 |
| 2012/0280803 A1 | 11/2012 | Sutardja | |

FOREIGN PATENT DOCUMENTS

| | | |
|---|---|---|
| JP | 2001-346270 | 12/2001 |
| JP | 2007-043685 | 2/2007 |
| JP | 2008-178111 | 7/2008 |
| KR | 100724830 | 5/2007 |
| KR | 1020080080424 | 9/2008 |

OTHER PUBLICATIONS

CEA Standard, Web-based Protocol and Framework for Remote User Interface on UPnP Networks and Internet (Web4CE), CEA-2014-A, XP002431656, Jul. 2007.

* cited by examiner

- DAE WG
  - Event
    - function onCUIRequest (Integer remoteDeviceHandle, String requestedCUIName)
    - function onCompleteReceivingCUI (String[] cuiNameList)
  - Method
    - boolean isRCExist ()
    - boolean getCUI (String cuiURL)
    - boolean sendCUI (Integer remoteDeviceHandle, String cuiName)
  - Interface between Remote Control Plugin and IPTV Applications (RUIS)
    - Define HTTP User-Agent Header
    - OIPF/2.0.0 (<3rd RUIC capabilities>; [<vendorName>]; [<modelName>]; [<softwareVersion>]; [<hardwareVersion>]; <reserved>) [<appName>[/<appVersion>]]

FIG.14

Properties function onCUIRequest( Integer remoteDeviceHandle )

The function that is called when the Remote Device requests a Control UI that can handle the DAE application currently executed in the OITF. Before the onCUIRequest event is generated to the target application, the OITF saves the Remote Device's capability which comes with the request of the Control UI from the Remote Device, and the capability will be used by getCUI method to get the suitable Control UI from the IPTV Applications server.

The specified function is called with a single argument remoteDeviceHandle, which is defined as follows:

- Integer remoteDeviceHandle – the handle of the Remote Device which is currently being connected to the OITF.

--- function onCompleteReceivingCUI( string cuiPrefixURI )

The function that is called when it is completed to download the Control UI from the IPTV Applications server to the OITF and ready to send the Control UI to the Remote Device. After downloading a zip file containing the Control UI on the proper place of the OITF that the Remote Device can access, the zip file is going to be decompressed. Then, an application/oipfRemoteControlFunction object makes the prefix URI which indicates the location of the directory that contains the decompressed Control UI files (e.g. html, img, css etc). After making the prefix URI for the Control UI, it is going to be transferred to the parameter of this event.

The specified function is called with a single argument cuiPrefixURI, which is defined as follows:

- string cuiPrefixURI – The prefix URI of the Control UI to indicate the location of the directory where the Control UI is decompressed and to be used by the Remote Device to connect to the OITF (e.g. If a cuiPrefixURI parameter is "/cui/playercontroller/001/" and the CUI file name is "friends_cod_controller.html" which is decompressed in the "001" directory, then a DAE application would make a combined URI like "/cui/playercontroller/001/friends_cod_controller.html" with two values and this full URI will be sent to the Remote Device by the second parameter of the sendCUI method).

--- function onFailReceivingCUI( string cuiDownloadURI, string reason )

The function that is called when a Control UI download is failed. The specified function is called with two arguments cuiDownloadURI and reason, which are defined as follows:

- string cuiDownloadURI – The URI used by the parameter of the getCUI method.

- string reason – The reason about the download failed.

FIG.15A

| Boolean getCUI( String cuiDownloadURI ) | | |
|---|---|---|
| Description | Download a zip file containing the suitable Control UIs from the IPTV Applications server to the OITF by using the Remote Device's capability stored in the OITF and the URI which is the parameter of this method. When the application/oipfRemoteControlFunction object requests the Control UI to the IPTV Applications server by this method, it sends the HTTP message with the User-Agent header filled with the Remote Device's capability. This is an asynchronous method. The DAE application will be notified of the results of the download operation via events dispatched to onCompleteReceivingCUI or onFailReceivingCUI and corresponding DOM level 2 events. <br><br> This method SHALL return true if the download process starts without error, otherwise false is returned. | |
| Arguments | cuiDownloadURI | The URI that downloads a zip file containing the Control UIs from the server. This URI indicates the location of a zip file which contains several Control UIs and components of the Control UI (e.g. html files, images, css files, javascript files etc). |

| Integer getConnectedRemoteDevice() | |
|---|---|
| Description | Returns the handle of Remote Device which is currently connected to the OITF. If there is no connected remote device to the OITF, the return value is undefined. |

| Boolean sendCUI ( Integer remoteDeviceHandle, String cuiConnectURI ) | | |
|---|---|---|
| Description | Send the URI of the Control UI to the Remote Devices related to remoteDeviceHandles. <br><br> If it is successful to send the Control UI to the Remote Devices, this method SHALL return true. Otherwise, false is returned. | |
| Arguments | remoteDeviceHandles | The handle of Remote Device which is currently connected to the OITF. |
| Arguments | cuiConnectURI | The URI of the Control UI by which the Remote Device gets the Control UI from the OITF. |

FIG.15B

Step 1: The Control UI SHALL send a HTTP message (GET or POST) request to the OITF. The content of the HTTP Request SHALL be as follows:

- HTTP Request Header: It includes the following:
    - <a request (first) line of HTTP header> - as follows in each cases (GET, POST method). The request URI SHALL be same as the following:
        o GET /rcf/request_service?service_uri=<value> HTTP/1.1
        o POST /rcf/request_service HTTP/1.1
    - <other lines of HTTP headers> - as per RFC 2616 [HTTP]

- HTTP Request Body: If the HTTP method is GET, a HTTP request body is empty. On the other hand, if the HTTP method is POST, a HTTP request body SHALL include the following elements:
    - A service_uri=<a service URI value>: indicates a HTTP URI by which the DAE application will be rendered in the OITF.
      (ex. service_uri=http://210.222.123.23/iptv_service/cod/friends)

Step 2: The Control UI SHALL wait until it receives the HTTP Respond message from the OITF.

Step 3: The OITF returns the new Control UI URI which can control the requested IPTV service and is located in the OITF, but if the requested IPTV service doesn't have any related Control UI, a HTTP response body SHALL be empty. The content of the HTTP Response SHALL be as follows:

- HTTP Response Header: It includes the following:
    - <list of HTTP headers> - as per RFC 2616 [HTTP]

- HTTP Response Body: It includes the new Control UI URI:

Control UI URI: indicates a HTTP URI by which a DAE application will be controlled
(ex. /control_ui/friends_cui.html)

FIG.16

Step 1:  The Remote Device SHALL send a HTTP GET request to the OITF. The content of the HTTP Request SHALL be as follows:

HTTP Request Header: It includes the following:

<a request (first) line of HTTP header> - The request URI SHALL be same as the following:

o   GET /rcf/request_cui HTTP/1.1

<other lines of HTTP headers> - as per RFC 2616 [HTTP]

HTTP Request Body: Empty

Step 2:  The Remote Device SHALL wait until it receives the HTTP Respond message from the OITF.

Step 3:  The OITF returns the new Control UI URI which can control the requested IPTV service and is located in the OITF, but if the requested IPTV service doesn't have any related Control UI, a HTTP response body SHALL be empty. The content of the HTTP Response SHALL be as follows:

- HTTP Response Header: It includes the following:

<list of HTTP headers> - as per RFC 2616 [HTTP]

HTTP Response Body: It includes the requested Control UI URI:

Control UI URI: indicates a HTTP URI by which a DAE application will be controlled
(ex. http://<OITFAddress>:<PORT>/control_ui/friends_cui.html)

FIG.17

1
APPARATUS AND METHOD FOR REMOTE CONTROL IN A SHORT-RANGE NETWORK, AND SYSTEM SUPPORTING THE SAME

PRIORITY

This application claims priority under 35 U.S.C. §119(a) to applications filed with the Korean Intellectual Property Office on Sep. 1, 2009 and Oct. 12, 2009 and assigned Serial No. 10-2009-0082237 and 10-2009-0096927, respectively, the contents of both of which are incorporated herein by reference.

BACKGROUND OF THE INVENTION

1. Field of the Invention

The present invention generally relates to an apparatus and method for matching a User Interface (UI), for remote control in a short-range network. More particularly, the present invention relates to an apparatus and method for enabling operation of a Control UI (CUI) matching the capability of a device in a short-range network.

2. Description of the Related Art

Many industrial standardization organizations have been conducting extensive research to increase the performance of home networking based on a short-range network, such as Digital Living Network Alliance (DLNA), a Home Audio-Video Interoperability (HAVi), and Universal Plug and Play (UPnP).

In a home network, one device can control another device by Remote User Interface (RUI) technology. According to the RUI technology based on client-server architecture, an RUI Client (RUIC) fetches a UI from an RUI Server (RUIS) and allows a user to control the RUIS through the UI in the RUIC.

Accordingly, there exists a need for developing a method for receiving a UI from an RUIS in order to control the RUIS in an RUIC.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide an apparatus and method for providing an RUI so that a remote device can control an RUIS or an RUIC through the RUI.

Another aspect of exemplary embodiments of the present invention provides an apparatus and method for enabling an RUIS to provide an RUI matching the capability of a remote device.

A further aspect of exemplary embodiments of the present invention provides an apparatus and method for enabling a remote third device to receive a CUI matching the capability of the remote third device from an RUIS, so that the remote third device can control a remote UI device through the CUI.

In accordance with an aspect of exemplary embodiments of the present invention, there is provided a remote control method of an application execution device in a short-range network system, in which from a remote device that remotely controls the application execution device using a predetermined CUI, information about capability of the remote device is collected, a CUI request requesting a CUI to be used for remotely controlling a currently executed application and the information about the capability of the remote device are sent to an application server, a CUI matching the capability of the remote device is received from the application server in response to the CUI request, and the received CUI is sent to the remote device.

In accordance with another aspect of exemplary embodiments of the present invention, there is provided an application execution device for performing remote control in a short-range network system, in which a first entity collects, from a remote device that remotely controls the application execution device using a predetermined CUI, information about capability of the remote device, and a second entity sends a CUI request requesting a CUI to be used for remotely controlling a currently executed application and the information about the capability of the remote device to an application server, and receives a CUI matching the capability of the remote device from the application server in response to the CUI request. The first entity sends the CUI received from the second entity to the remote device.

In accordance with another aspect of exemplary embodiments of the present invention, there is provided a method for remotely controlling an application execution device using a predetermined CUI in a remote device in a short-range network system, in which information about capability of the remote device is sent to the application execution device, a CUI matching the capability of the remote device is received from the application execution device, and an application being executed in the application device is remotely controlled using the received CUI.

In accordance with a further aspect of exemplary embodiments of the present invention, there is provided a system for providing a DAE application through remote control, in which an application server provides a DAE application and a CUI, a remote device sends information about capability of the remote device after the remote device is connected to an application execution device, and receives a CUI matching the capability of the remote device from the application execution device, and the application device collects the information about the capability of the remote device from the remote device, sends a CUI request requesting a CUI to be used for remotely controlling a currently executed application and the information about the capability of the remote device to the application server, and receives the CUI matching the capability of the remote device from the application server in response to the CUI request.

BRIEF DESCRIPTION OF THE DRAWINGS

The above and other objects, features and advantages of certain exemplary embodiments of the present invention will be more apparent from the following detailed description taken in conjunction with the accompanying drawings, in which:

FIG. 14 describes APIs and an interface according to an embodiment of the present invention;

FIGS. 15A and 15B describe APIs according to an embodiment of the present invention;

FIG. 16 describes interfaces and messages for implementing an IPTV service in an OITF by a third RUIC according to an embodiment of the present invention; and FIG. 17 describes interfaces and messages for requesting a CUI to control a DAE application currently being executed in an OITF by a third RUIC according to an embodiment of the present invention.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In accordance with embodiments of the present invention as set forth below, a Remote User Interface Client (RUIC) refers to a device that sends a Remote User Interface (RUI) and control information to a client in a client-server architecture system. The RUIC may be a set-top box that controls an Internet Protocol TV (IPTV), etc.

The RUIC receives UIs that can be rendered in the RUIC and Control UIs (CUIs) that can control the rendered UIs from a Remote User Interface Server (RUIS). The RUIC and/or the RUIs rendered in the RUIC are controlled through the CUIs.

In an embodiment of the present invention, a third device, which is a remote control RUIC device, controls an RUIC through a CUI. The CUI may be received from the RUIC or the RUIS. The third device may be any of a mobile device (e.g. a portable phone), a portable device (e.g. a small-size display equipped with a communication function), etc. The following description is made with the appreciation that the term 'remote control RUIC device' is used interchangeably with the terms 'third device', 'third RUIC', or 'third RUIC device'.

Figure 1:
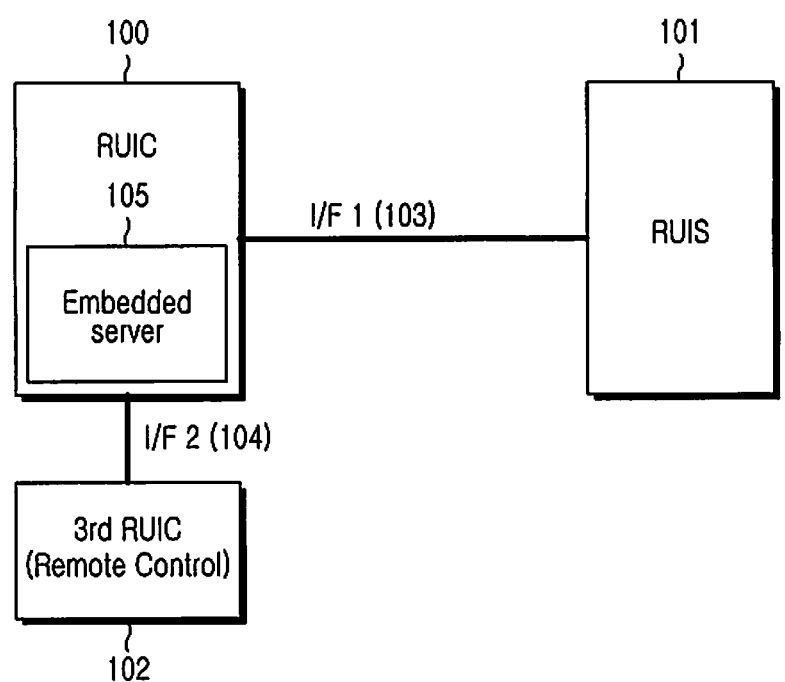
FIG. 1 is a block diagram of a short-range network system to which the present invention is applied.

FIG. 1 is a block diagram of a general short-range network system to which embodiments of the present invention are applied, that is, an architecture that enables control of an RUIC through a third RUIC.

Referring to FIG. 1, an RUIC 100 communicates with an RUIS 101 according to a preset protocol via a first interface 103 (I/F 1). The RUIC 100 receives an RUI and control information from the RUIS 101 based on a protocol configured for I/F 1. The control information may include a CUI as well as control information needed for controlling an RUI rendered in the RUIC 100.

An embedded server 105 of the RUIC 100 extracts the CUI from the control information received from the RUIS 101 and sends the CUI to a third RUIC 102, for controlling the RUIC 100. The CUI is rendered in the third RUIC 102 so that a user of the third RUIC 102 may control the RUIC 100 through the CUI.

The embedded server 105 is a logical entity that may reside inside or outside the RUIC 100.

Figure 2:
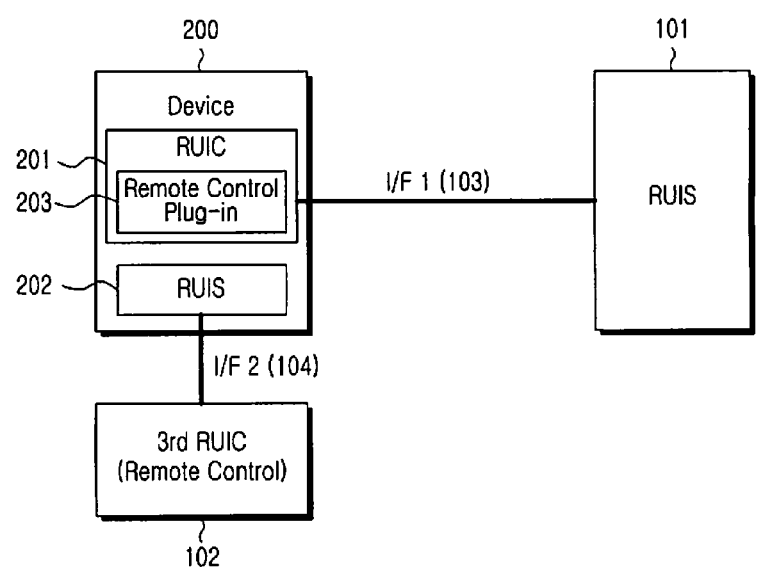
FIGS. 2 and 3 are block diagrams of short-range network systems having an embedded server outside an RUIC according to embodiments of the present invention.
Figure 3:
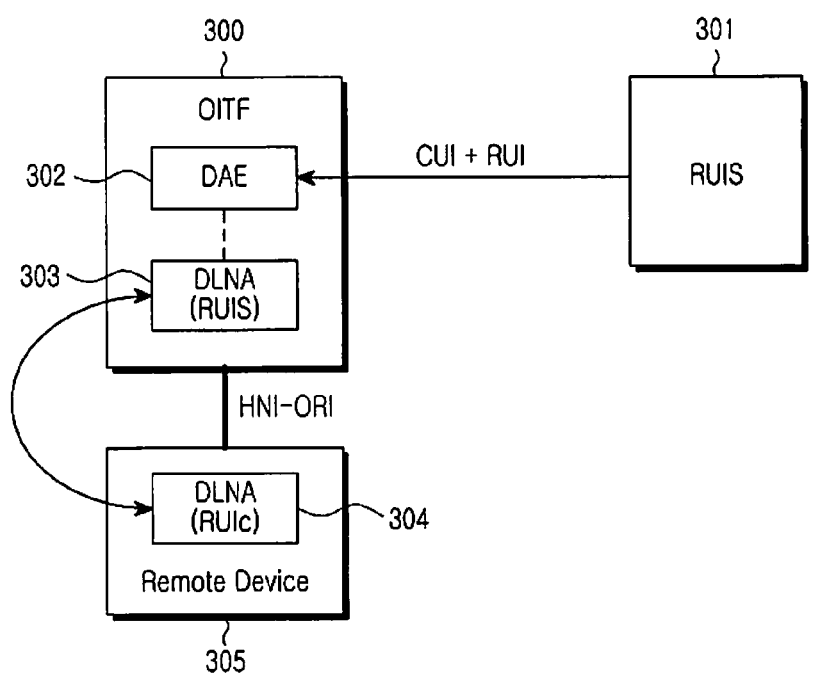

In the illustrated cases of FIGS. 2 and 3, the embedded server 105 is configured outside an RUIC 201. Especially, the embedded server 105 may be an embedded server functional entity that resides within a Consumer Electronics Association-2014 (CEA-2014) RUIS 202, a DLNA RUIS 303, or an Open IPTV Forum Terminal Function (OITF) 300 of the Open IPTV Forum, for communication with a mobile/portable device. In addition, the embedded server 105 may even incorporate the function of a remote control plug-in 203 into it.

The RUIC 100 or an RUI rendered in the RUIC 100 may be controlled via a second interface 104 (I/F 2) between the RUIC 100 and the third RUIC 102 according to UPnP or HyperText Transfer Protocol (HTTP), using a CUI rendered in the third RUIC 102.

Figure 4:
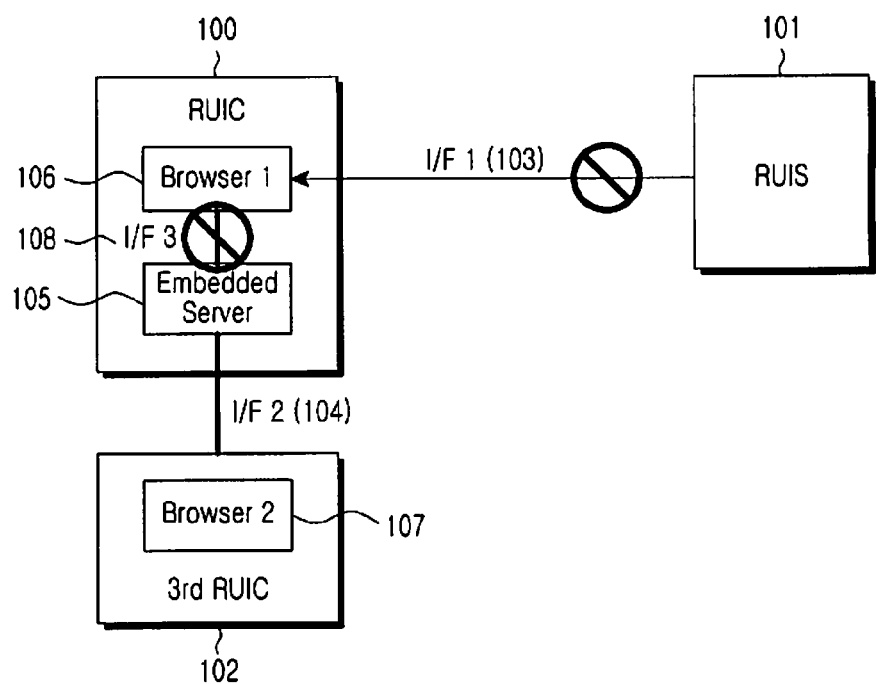
FIG. 4 illustrates interfaces in the architecture of FIG. 1.

FIG. 4 illustrates the interfaces in the architecture of FIG. 1. It is noted from FIG. 4 that a protocol needs to be defined for the third RUIC 102 to notify the RUIS 101 of the capability of the third RUIC 102.

Referring to FIG. 4, the third RUIC 102 may fetch a CUI matching its capability from the RUIC 100, through capability exchange with the embedded server 105 of the RUIC 100. This is possible because a protocol was defined for I/F 2 between the third RUIC 102 and the RUIC 100.

However, there is no specified method for enabling the third RUIC 102 to send information about its capability to the RUIS 101. As a consequence, the third RUIC 102 cannot fetch a CUI matching its capability from the RUIS 101.

Therefore, protocols will be defined for I/F 1 and a third interface 108 (I/F 3) such that the RUIS 101 may provide the third RUIC 102 with a CUI matching the capability of the third RUIC 102 in accordance with embodiments of the present invention.

A detailed description will be given of an apparatus and method for allowing a third RUIC to receive a CUI matching its capability from an RUIS, for controlling an RUI rendered in an RUIC according to an embodiment of the present invention.

Figure 5:
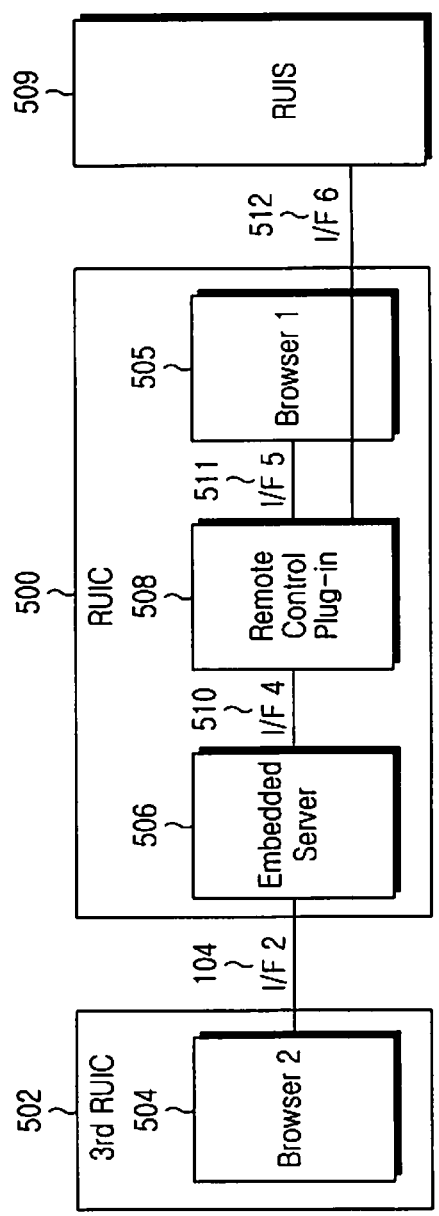
FIG. 5 is a block diagram of a short-range network system according to an embodiment of the present invention.

FIG. 5 is a block diagram of a short-range network system according to an embodiment of the present invention. Specifically, FIG. 5 illustrates interfaces through which a third RUIC 502 sends information about its capability to an RUIS 509 through an RUIC 500.

Referring to FIG. 5, the third RUIC 502 sends information about its capability to an embedded server 506 of the RUIC 500 via I/F 2. The embedded server 506 in turn sends the received capability information to a remote control plug-in 508 via a fourth interface 510 (I/F 4).

The remote control plug-in 508 stores the capability information. A first browser 505 (Browser 1) instructs the remote control plug-in 508 to download a CUI through communication with an RUI rendered by Browser 1 by sending a CUI download command to the remote control plug-in 508 via a fifth interface 511 (I/F 5).

Upon receipt of the CUI download command from Browser 1, the remote control plug-in 508 converts the stored capability information into a format transmittable through a sixth interface 152 (I/F 6). When needed, the format of the stored capability information may not be converted. I/F 6 is defined between the RUIC 500 and the RUIS 509.

The remote control plug-in 508 sends an HTTP message requesting CUI download to the RUIS 509 via I/F 6. A header of the HTTP message includes the capability information converted to a user-agent value. As stated before, the capability information may not be converted, when needed.

Figure 6:
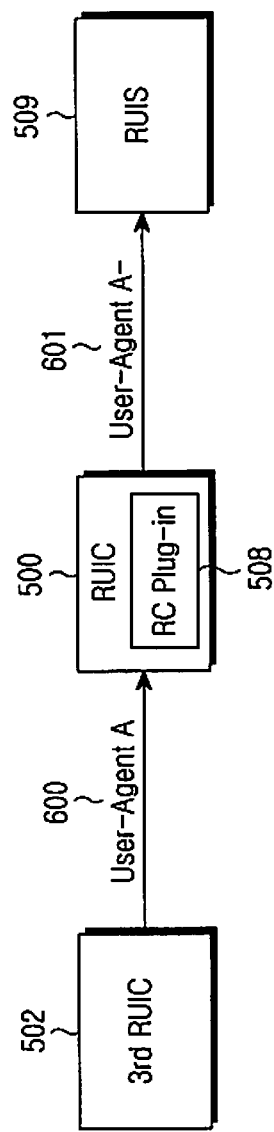
FIG. 6 illustrates an operation for sending capability information in the short-range network system according to an embodiment of the present invention.

FIG. 6 illustrates an operation for sending capability information in the short-range network system according to an embodiment of the present invention. In FIG. 6, capability information about the third RUIC 502 is sent to the RUIS 509 through the RUIC 500.

Referring to FIG. 6, the third RUIC 502 sends its capability information to the RUIC 500.

Table 1 below illustrates an exemplary format of capability information included in an HTTP Header.

TABLE 1

| User-Agent: CE-HTML/1.0 (<capabilities>) |
| --- |

Upon receipt of the capability information expressed as a User-Agent value illustrated in Table 1, the RUIC 500 provides the received capability information to the remote control plug-in 508. The remote control plug-in 508 converts the capability information into a format transmittable to the RUIS 509 (e.g. User-Agent A-).

For example, if the capability information is sent in a format defined by the OIPF, a header structure defined by the OIPF may be modified to include the converted capability information in the HTTP Header, as illustrated in Table 2.

TABLE 2

| User-Agent: OIPF/1.1.0 (<capabilities>; [<vendorName>]; [<modelName>]; [<softwareVersion>];<hardwareVersion>];<reserved>) [<appName>[/<appVersion>]] |
| --- |

The capability information illustrated in Table 1 is included in the capability information having the configuration illustrated in Table 2. For example, the capability information may be included in a <reserved> field illustrated in Table 2.

If capability information 600 taking the form of User-Agent A sent from the third RUIC 502 to the RUIC 500 is configured in the same format as capability information 601 taking the form of User-Agent A- sent from the RUIC 500 to the RUIS 509, the capability information 600 may be sent from the RUIC 500 to the RUIS 509 without being changed in format and contents.

Figure 7A:
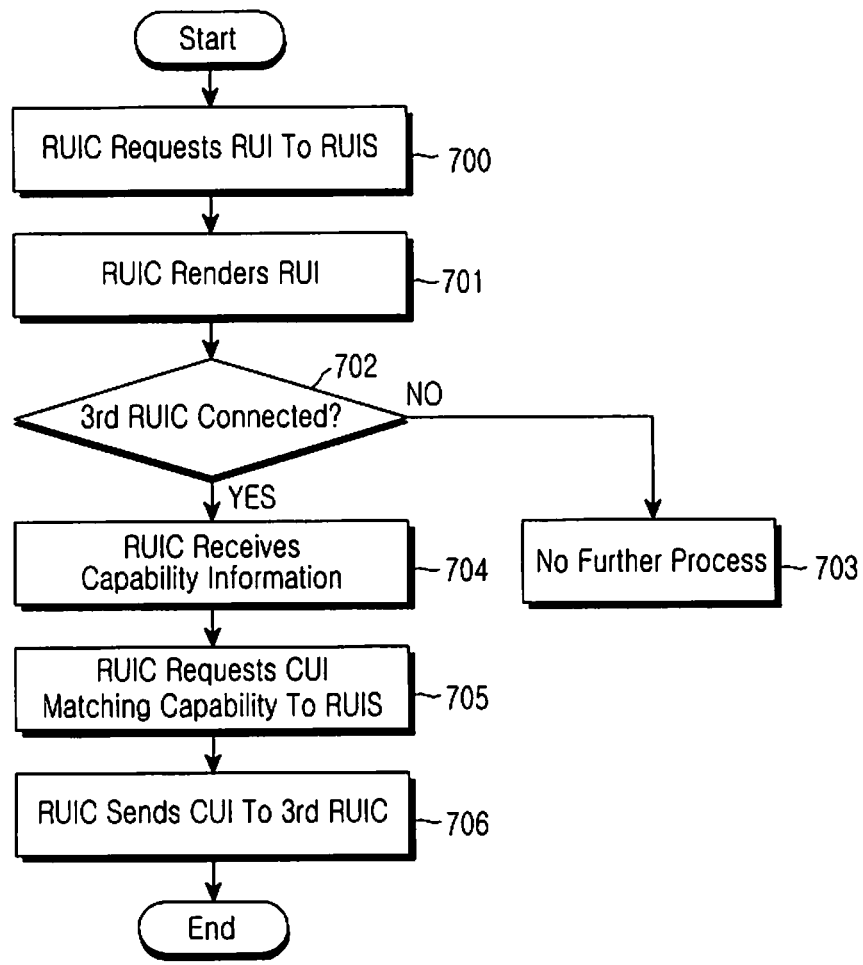
FIGS. 7A and 7B are flowcharts illustrating methods for providing a capability-matching CUI in the short-range network system according to embodiments of the present invention.
Figure 7B:
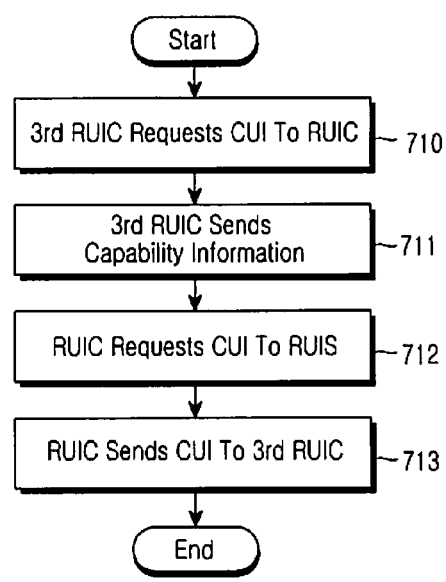

FIGS. 7A and 7B are flowcharts illustrating methods for providing a capability-matching CUI in a short-range network system according to embodiments of the present invention. That is, FIGS. 7A and 7B illustrate operations for providing a third RUIC with a CUI matching the capability of the third RUIC through an RUIC by an RUIS.

Specifically, FIG. 7A is a flowchart illustrating a CUI providing operation in the case where a third RUIC is currently connected to an RUIC, and FIG. 7B is a flowchart illustrating a CUI providing operation in the case where a third RUIC is not currently connected to an RUIC, and requests a CUI when the third RUIC is connected to the RUIC later.

Referring to FIG. 7A, an RUIC requests an RUI to an RUIS in step 700. The RUIS sends the requested RUI to the RUIC. In step 701, the RUIC renders the RUI.

The RUI monitors the existence of a third RUIC currently connected to the RUIC in step 702. In the absence of a currently connected third RUIC, no further CUI request process associated with the RUI is proceeded in step 703. When the third RUIC is connected to the RUIC later and requests a CUI, the operation illustrated in FIG. 7B is performed.

On the other hand, in the presence of a third RUIC currently connected to the RUIC in step 702, the RUIC requests capability information to the third RUIC and receives the capability information from the third RUIC in step 704.

In step 705, the RUIC requests a CUI matching the capability of the third RUIC to the RUIS. Then the RUIS sends the CUI to the RUIC.

The RUIC sends the CUI to the third RUIC in step 706.

Referring to FIG. 7B, if the third RUIC is not currently connected to the RUIC at the moment the RUI is rendered in the operation of FIG. 7A but later it is connected to the RUIC and requests a CUI to the RUIC, the RUIC receives the CUI request from the third RUIC while the RUI is being rendered in step 710. In step 711, the third RUIC sends its capability information to the RUIC.

In step 712, the RUIC sends a CUI request along with the capability information to the RUIS. Then the RUIS extracts a CUI matching a capability indicated by the capability information and sends the CUI to the RUIC. The RUIC sends the CUI to the third RUIC in step 713.

Figure 8:
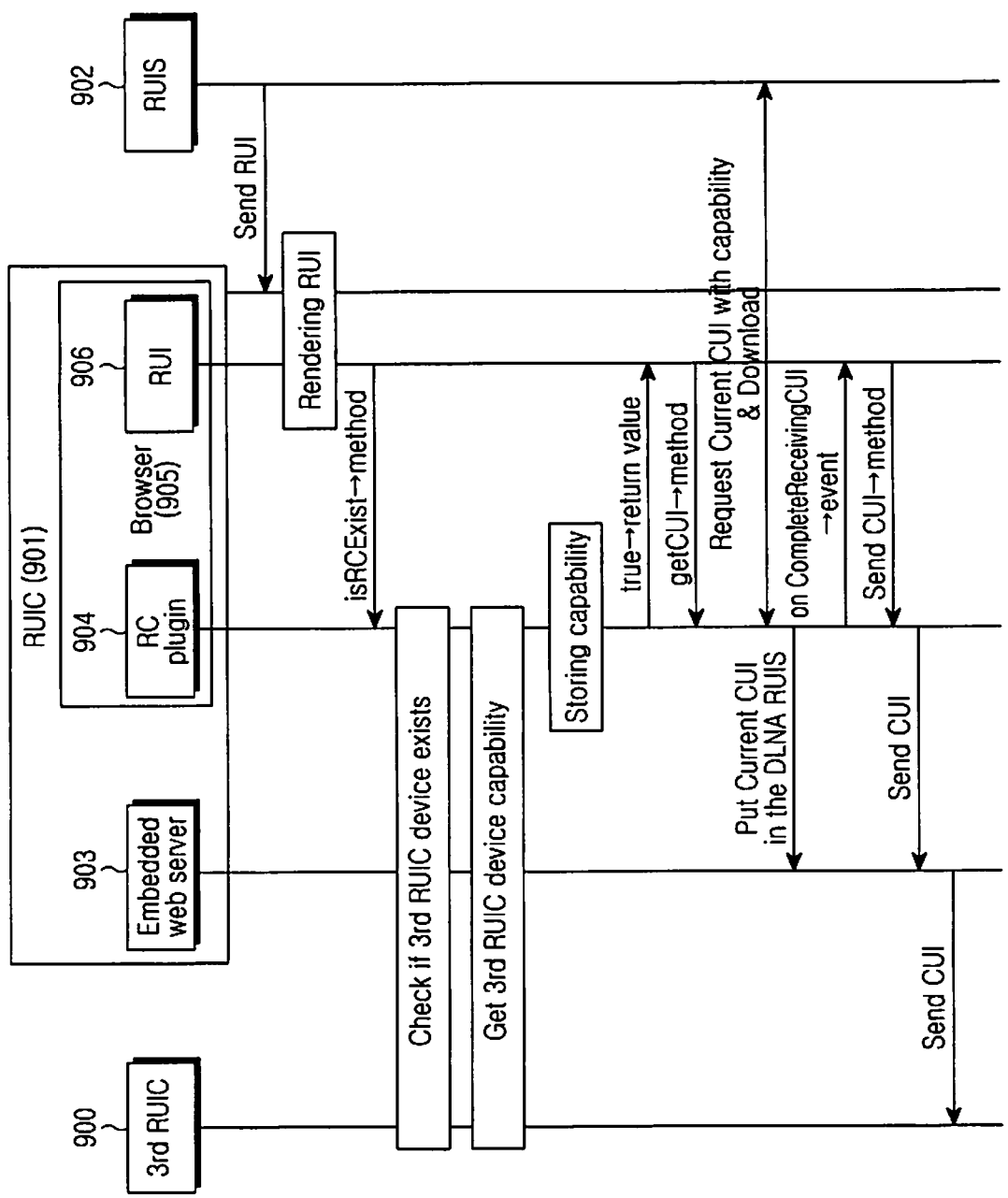
FIG. 8 is a diagram illustrating a signal flow for providing a CUI matching the capability of a third RUIC to the third RUIC, when an RUI has already been rendered in an RUIC according to an embodiment of the present invention.

FIG. 8 is a diagram illustrating a signal flow for sending a CUI matching the capability of a third RUIC to the third RUIC, when an RUI is rendered in an RUIC according to an embodiment of the present invention.

Referring to FIG. 8, upon receipt of an RUI rendering command from a third terminal or a traditional remote control, an RUIC 901 requests an RUI to an RUIS 902.

Then the RUIC 901 receives the RUI from the RUIS 902 and renders the received RUI in its browser 905. While being rendered, the RUI asks a remote control plug-in 904 whether there is a third RUIC currently connected to the RUIC 901 through a isRCExist method.

The remote control plug-in 904 in turn asks an embedded server 903 whether there is a currently connected third RUIC. Then the embedded server 903 checks the presence or absence of a connected third RUIC.

In the presence of a connected third RUIC 900, the embedded server 903 sends a message requesting capability information to the third RUIC 900. The third RUIC 900 sends its capability information along with a CUI request message to the embedded server 903.

If the third RUIC 900 has a history of accessing the embedded server 903 and sending an HTTP message to the embedded server 903, the embedded server 903 internally stores a User-Agent value set in the HTTP header of the HTTP message at the time. When the third RUIC 900 is disconnected from the embedded server 903, the stored User-Agent value is deleted.

Until the connection between the third RUIC 900 and the embedded server 903 is released, the third RUIC 900 is in a state where it can receive a notification from the embedded server 903.

In this state, upon receipt of a command to monitor the presence of the connected third RUIC 900 from the remote control plug-in 904, the embedded server 903 determines whether it has the User-Agent value. When detecting the User-Agent value, the embedded server 903 sends the User-Agent value to the remote control plug-in 904.

The remote control plug-in 904 stores the received User-Agent value internally and sends a value 'true' indicating the presence of the currently connected third RUIC 900 to the RUI 906. The order of the value 'true' transmission and the capability information storing may be changed.

Upon receipt of the value 'true', the RUI 906 sends a getCUI command to the remote control plug-in 904, requesting a CUI for use in controlling the RUI 906.

The remote control plug-in 904 converts the format of the capability information suitably for the RUIS 902 and sends the converted capability information along with a CUI request to the RUIS 902. Then a CUI is downloaded at an appropriate position in the embedded server 903, for transmission to the third RUIC 900.

To simplify the implementation of the embodiment of the present invention, the process from calling an isRCExist method to returning the value 'true' to the RUI 906 may not be performed. Instead, if the third RUIC 900 has a history of accessing the RUIC 901 and sending an HTTP message to the RUIC 901 at least once, the User-Agent value is kept in the RUIC 901. When the RUI 906 calls a getCUI method from the remote control plug-in 904, the remote control plug-in 904 requests a CUI associated with the RUI 906 to the RUIS 902 by simply using the User-Agent value or converting the format of the User-Agent value.

Upon completion of the CUI download, the remote control plug-in 904 sends an onCompleteReceiveCUI event to the RUI 906, indicating that the CUI download has been completed. Then the RUI 906 sends a sendCUI command to the remote control plug-in 904, instructing the remote control plug-in 904 to send the CUI to the third RUIC 900.

Upon receipt of the command, the remote control plug-in 904 sends a CUI send command to the embedded server 903. The embedded server 903 then sends the CUI or a URL of the CUI to the third RUIC 900.

In case of receiving the URL of the CUI, the third RUIC 900 receives the CUI matching its capability at the URL and renders the received CUI.

Figure 9:
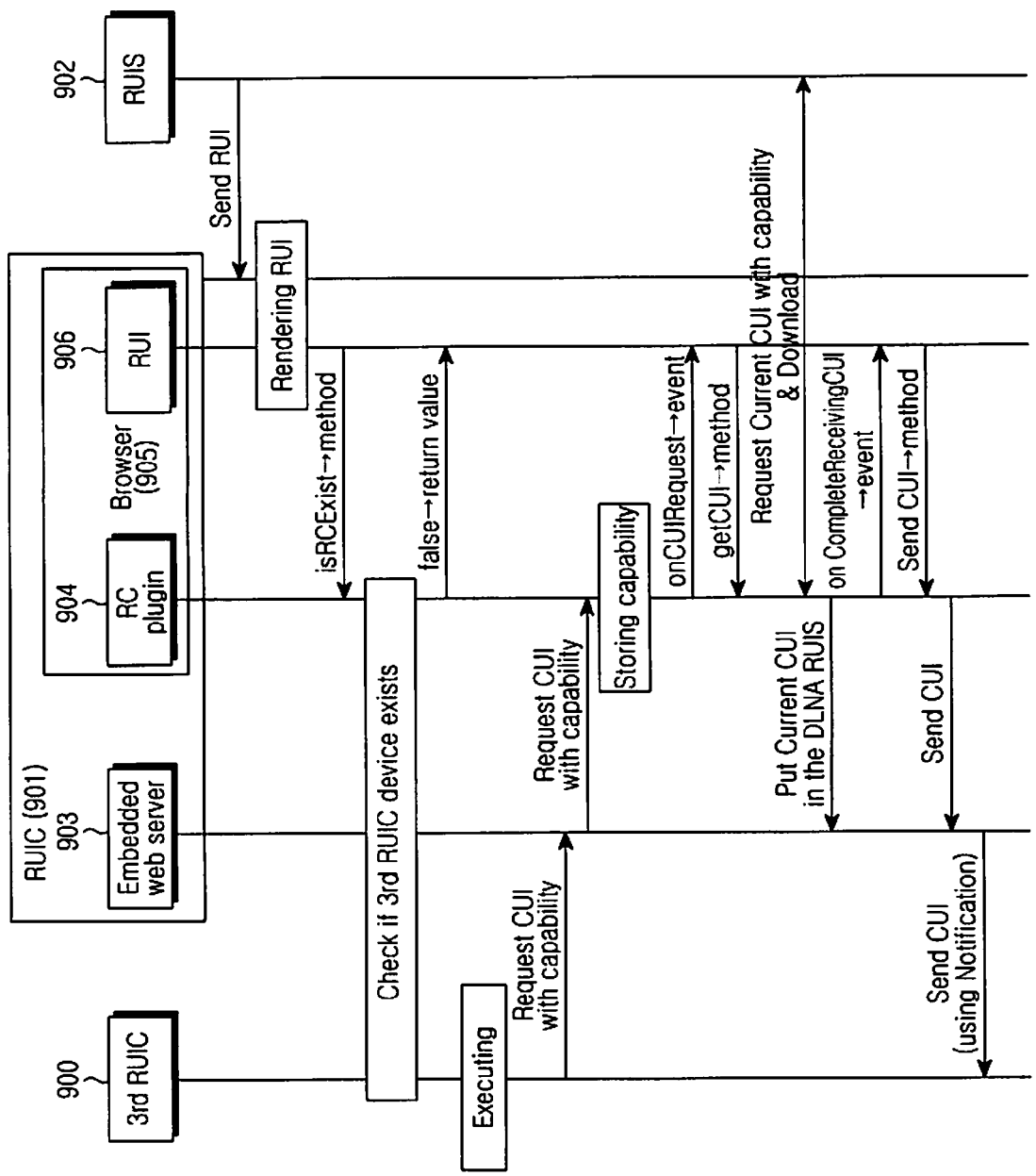
FIG. 9 is a diagram illustrating a signal flow for providing a CUI matching the capability of a third RUIC to the third RUIC, when an RUI has already been rendered in an RUIC according to another embodiment of the present invention.

FIG. 9 is a diagram illustrating a signal flow for providing a CUI matching the capability of a third RUIC to the third RUIC, when an RUI has already been rendered in an RUIC according to another embodiment of the present invention.

Referring to FIG. 9, as an RUI is rendered in the browser 905 of the RUIC 901, it is determined whether there is a currently connected third RUIC 900. In the absence of the currently connected third RUIC 900, no further CUI-associated process is proceeded.

Upon receipt of a CUI request message including capability information about the third RUIC 900 from the third RUIC 900 later, the embedded server 903 sends the capability information to the remote control plug-in 904.

The remote control plug-in 904 stores the received capability information and then sends an onCUIRequest event indicating the reception of the CUI request to the RUI 906 currently being rendered in the browser 905. The RUI 906 then sends a getCUI command requesting a CUI for controlling the RUI 906 to the remote control plug-in 904.

The remote control plug-in 904 converts the format of the capability information about the third RUIC 900 into a format transmittable to the RUIS 902 and sends the converted capability information along with a CUI download request to the RUIS 902. Thereafter, the remote control plug-in 904 downloads a CUI from the RUIS 902 and stores the CUI at an appropriate location. The subsequent operation is performed in the same manner as illustrated in FIG. 8.

Figure 10:
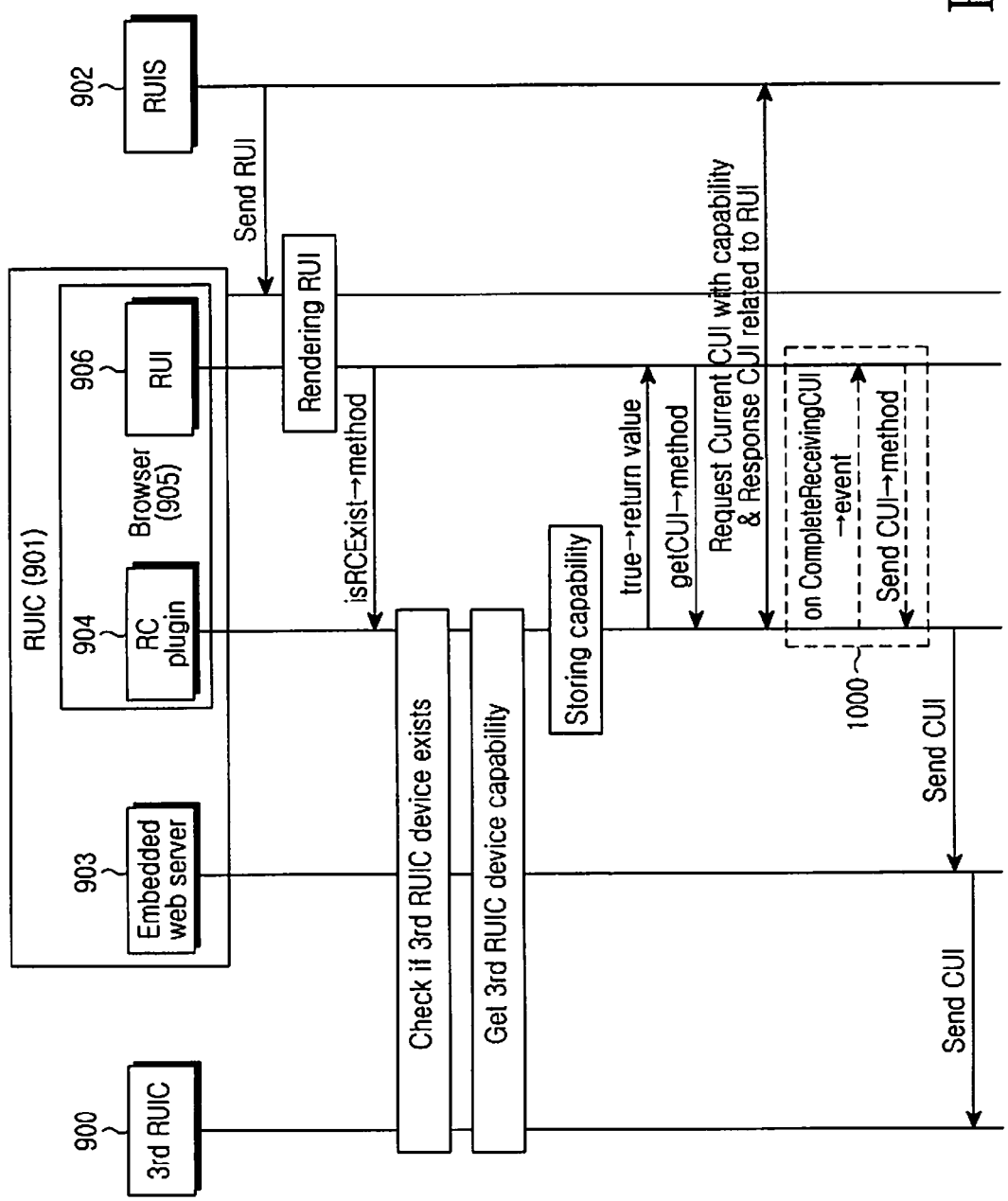
FIG. 10 is a diagram illustrating a signal flow for providing a CUI matching the capability of a third RUIC to the third RUIC, when an RUI has already been rendered in an RUIC according to another embodiment of the present invention.

FIG. 10 is a diagram illustrating a signal flow for providing a CUI matching the capability of a third RUIC to the third RUIC, when an RUI has already been rendered in an RUIC according to another embodiment of the present invention.

In accordance with the embodiment of the present invention illustrated in FIG. 10, the RUIC sends a CUI to the third RUIC in a forwarding scheme, not in a download scheme.

Referring to FIG. 10, the RUI 906 requests the remote control plug-in 904 to receive a CUI from the RUIS 902. The remote control plug-in 904 then requests the CUI to the RUIS 902. The RUIS 902 encapsulates the contents of the requested CUI in a body of an HTTP message and sends the HTTP message to the remote control plug-in 904.

The remote control plug-in 904 extracts the contents of the CUI from the received HTTP message and sends the extracted contents of the CUI to the RUI 906. The RUI 906 commands the remote control plug-in 904 to send the contents of the CUI to the third RUIC 900 through an embedded Web server 903. The contents of the CUI may be modified by the RUI 906, the remote control plug-in 904, or the embedded Web server 903, when needed.

Signaling 1000 of onCompleteReceivingCUI and sendCUI may not be performed according to situations. For example, in the case where the remote control plug-in 904 requests a CUI to the RUIS 902 and receives a response from the RUIS 902, if it is not necessary to notify the RUI 906 of what the response is about, the signaling 1000 is not performed. In this case, the remote control plug-in 904 sends the contents of the CUI extracted from the HTTP message received from the RUIS 902 to the embedded Web server 903. Then the embedded Web server 903 sends the received contents of the CUI to the third RUIC 900.

Figure 11:
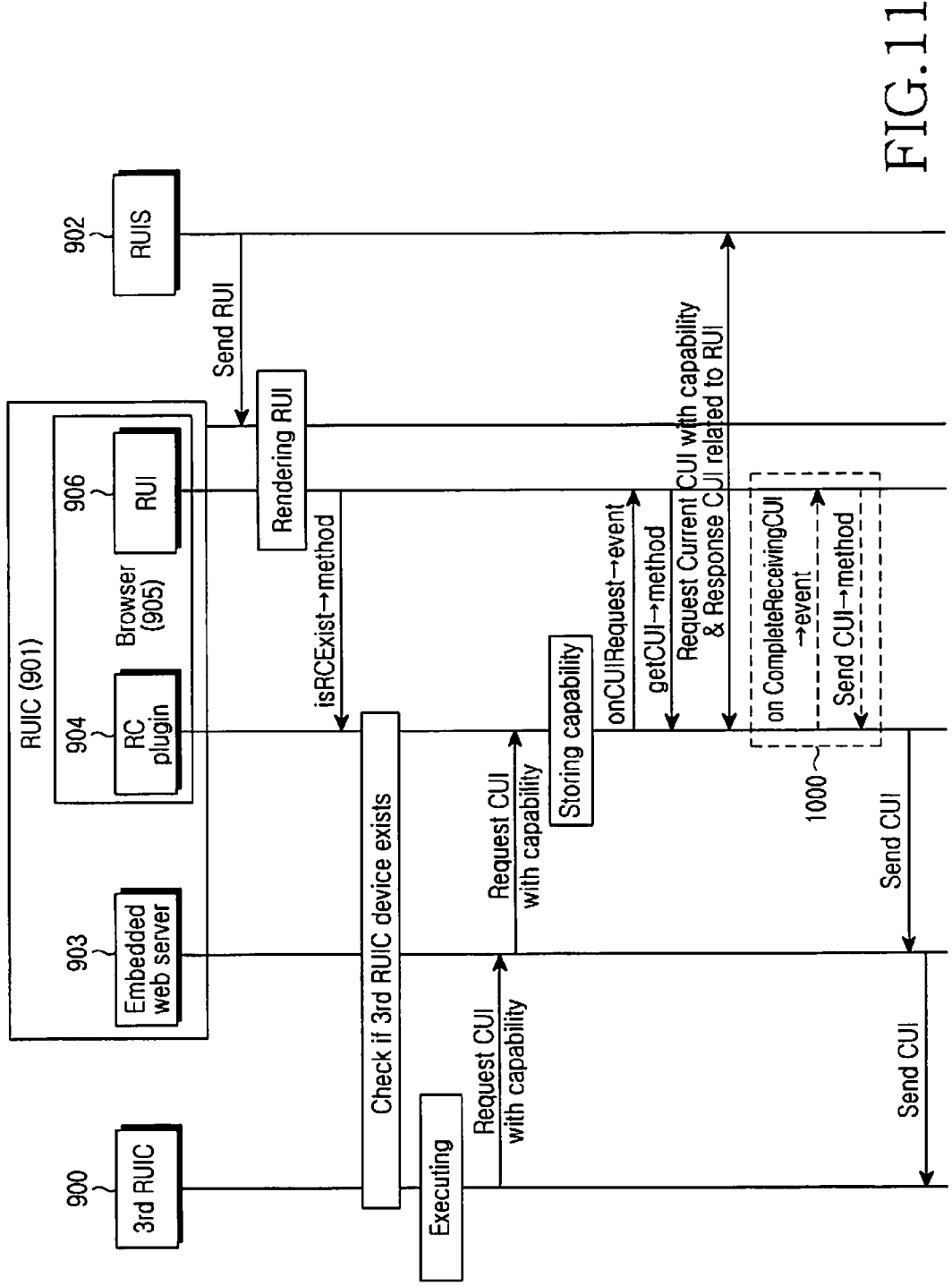
FIG. 11 is a diagram illustrating a signal flow for providing a CUI matching the capability of a third RUIC to the third RUIC, when an RUI has already been rendered in an RUIC according to another embodiment of the present invention.

FIG. 11 is a diagram illustrating a signal flow for providing a CUI matching the capability of a third RUIC to the third RUIC, when an RUI has already been rendered in an RUIC according to another embodiment of the present invention.

In accordance with the embodiment of the present invention illustrated in FIG. 11, the RUIC sends a CUI to the third RUIC in a forwarding scheme, not in a download scheme.

Referring to FIG. 11, as an RUI is rendered in the browser 905 of the RUIC 901, it is determined whether there is a currently connected third RUIC 900. In the absence of the currently connected third RUIC 900, no further CUI-associated process is proceeded.

Upon receipt of a CUI request message including capability information about the third RUIC 900 from the third RUIC 900 later, the embedded server 903 sends the capability information to the remote control plug-in 904.

The remote control plug-in 904 stores the received capability information and then sends an onCUIRequest event indicating the reception of the CUI request to the RUI 906 currently being rendered in the browser 905. The RUI 906 then sends a getCUI command requesting a CUI for controlling the RUI 906 to the remote control plug-in 904.

Then the remote control plug-in 904 requests a CUI to the RUIS 902. The RUIS 902 encapsulates the contents of the requested CUI in a body of an HTTP message and sends the HTTP message to the remote control plug-in 904.

The remote control plug-in 904 extracts the contents of the CUI from the received HTTP message and sends the extracted contents of the CUI to the RUI 906. The RUI 906 commands the remote control plug-in 904 to send the contents of the CUI to the third RUIC 900 through the embedded Web server 903. The contents of the CUI may be modified by the RUI 906, the remote control plug-in 904, or the embedded Web server 903, when needed.

The signaling 1000 of onCompleteReceivingCUI and sendCUI may not be performed according to situations. For example, in the case where the remote control plug-in 904 requests a CUI to the RUIS 902 and receives a response from the RUIS 902, if it is not necessary to notify the RUI 906 of what the response is about, the signaling 1000 is not performed. In this case, the remote control plug-in 904 sends the contents of the CUI extracted from the HTTP message received from the RUIS 902 to the embedded Web server 903. Then the embedded Web server 903 sends the received contents of the CUI to the third RUIC 900.

Figure 12:
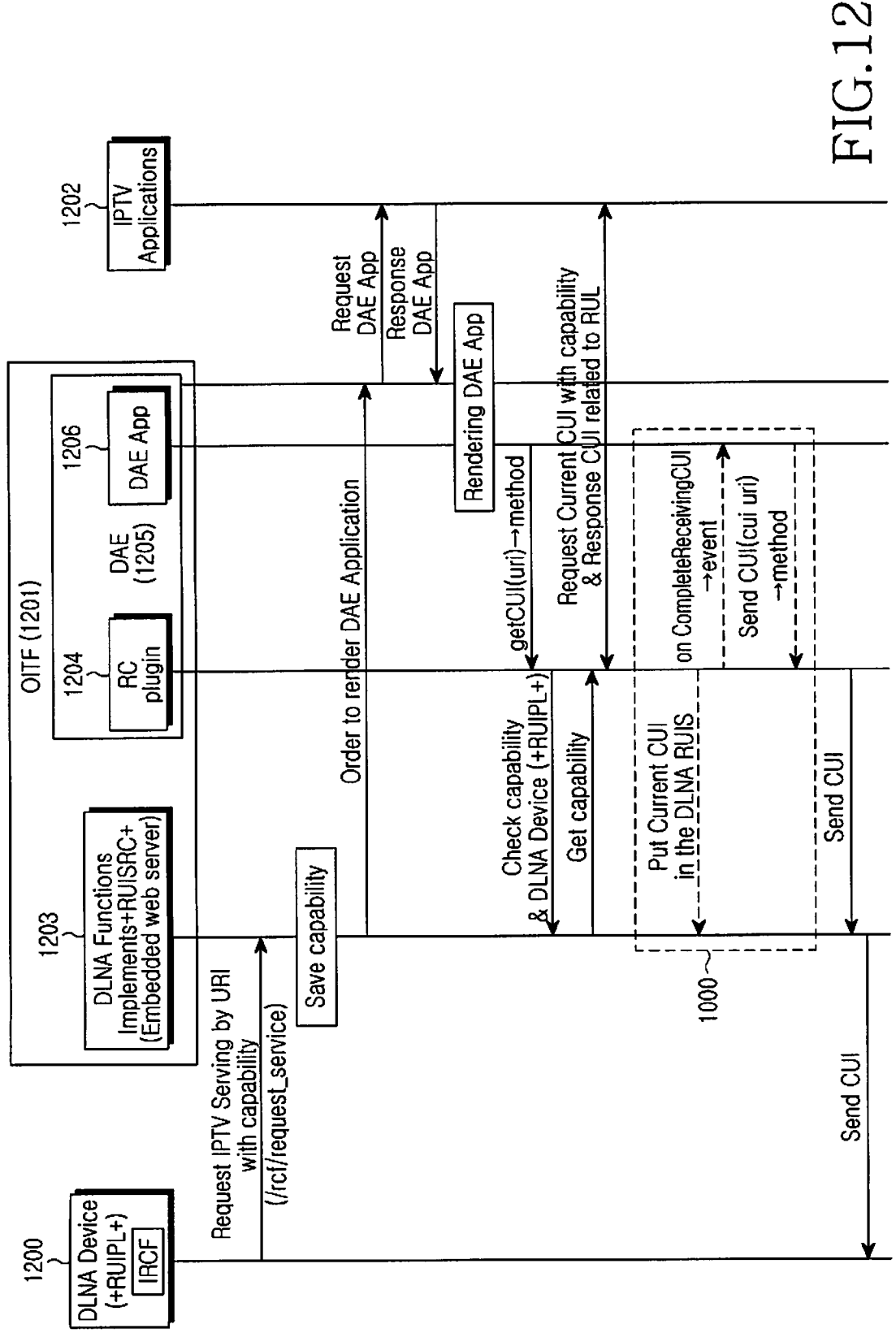
FIG. 12 is a diagram illustrating a signal flow for providing a CUI matching the capability of a third RUIC to the third RUIC, when an RUI is not rendered in an RUIC according to an embodiment of the present invention.

FIG. 12 is a diagram illustrating a signal flow for an operation for sending a CUI matching a service requested by a DLNA device according to an embodiment of the present invention. The requested service is an IPTV service. The IPTV service may be requested to an OITF through a DLNA device (+RUIPL+) according to the Open IPTV Forum standard.

Referring to FIG. 12, a DLNA device (+RUIPL+) 1200 requests an IPTV service to an OITF 1201 through a predefined Universal Resource Identifier (URI). The DLNA device (+RUIPL+) 1200 also sends its capability information along with a service request message, when requesting the IPTV service.

DLNA functions (+RUISRC+) 1203 store the capability information and command a Declarative Application Environment (DAE) browser 1205 to receive a DAE application matching the IPTV service from an IPTV applications server 1202 and execute the DAE application.

When a DAE application 1206 matching the IPTV service is executed in the DAE browser 1205 in response to the command, the DAE application 1206 provides a getCUI method along with a URI of a CUI to a remote control plug-in 1204. Then the remote control plug-in 1204 retrieves the stored capability information from the DLNA functions (+RUISRC+) 1203 and processes the capability information such that it can be sent to the IPTV applications server 1202. When needed, the capability information may not be processed.

Meanwhile, the remote control plug-in 1204 sends the processed (or non-processed) capability information to the IPTV applications server 1202 using the URI parameter set in the getCUI method, and receives a CUI from the IPTV applications server 1202. The CUI may be received in two schemes.

In the case where a CUI is received in a download scheme, the remote control plug-in 1204 downloads a compressed file including CUIs from the IPTV applications server 1202 to the DLNA functions 1203 and decompresses the downloaded compressed file, and indicates an accessible location to the DAE application 1206 in the form of a URL corresponding to the decompressed directory, using an onCompleteReceivingCUI event function.

The DAE application 1206 generates a new URI by attaching the received prefix URI to the name of a CUI included in an internally stored CUI list. The DLNA device 1200 may access the CUI of the OITF 1201 using the new URI.

The new URI is sent to the DLNA device 1200 through a sendCUI method. The DLNA device 1200 calls the URI and receives the CUI from the DLNA functions 1203 in the OITF 1201.

On the other hand, in the case where a CUI is received from the IPTV applications server 1202 in a forwarding scheme, the DAE application 1206 receives the HTML contents of a CUI from the IPTV applications server 1202 through a getCUI method. The DAE application 1206 modifies the HTML contents, when needed, and then sends the modified HTML contents to the DLNA device 1200 through a sendCUI method. If the HTML contents do not need to be modified, the DAE application 1206 may simply send the HTML contents to the DLNA device 1200 through the sendCUI method.

The DLNA device 1200 renders the received HTML contents on its screen.

As described above, HTML contents are included in sendCUI in the forwarding scheme, whereas a URI value is included in sendCUI in the download scheme.

Figure 13:
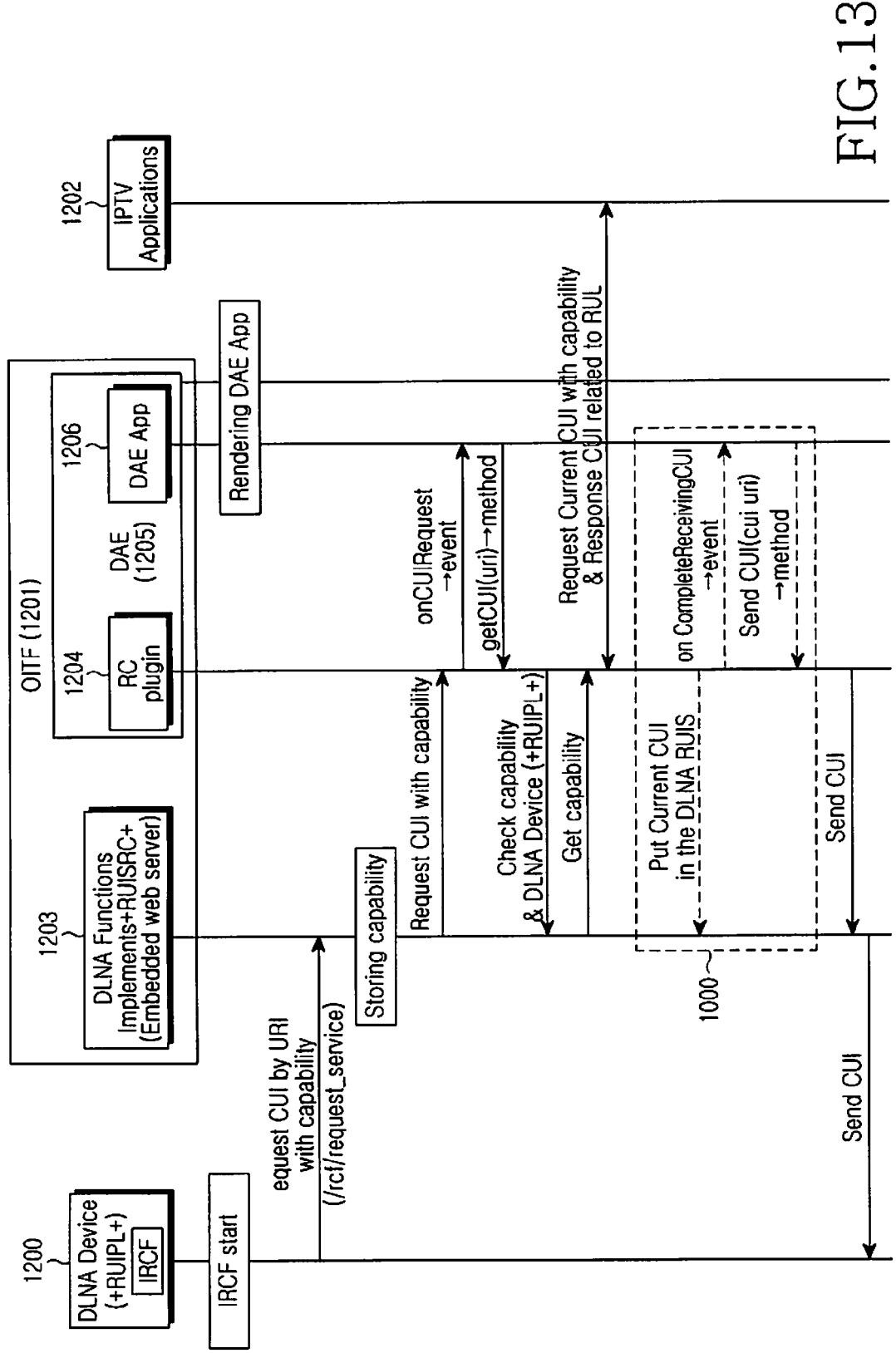
FIG. 13 is a diagram illustrating a signal flow for providing a CUI matching the capability of a third RUIC to the third RUIC, when an RUI has already been rendered in an RUIC according to a further embodiment of the present invention.

FIG. 13 is a diagram illustrating a signal flow for receiving a CUI matching an IPTV service going on in an OITF through a DLNA device (+RUIPL+) according to a further embodiment of the present invention, which is applicable to the Open IPTV Forum standard.

Referring to FIG. 13, it is assumed herein that an IPTV service is going on by the DAE application 1206 in the OITF 1201. In this state, a user requests a CUI to the OITF 1201 through a predefined URI using an ITF Remote Control Function (IRCF) of the DLNA device 1200 in order to control the on-going IPTV service. Herein, the DLNA device 1200 sends its capability information along with a CUI request message to the DLNA functions 1203. The capability information is stored in the DLNA functions 1203.

The DLNA functions 1203 notify the remote control plug-in 1204 of the reception of the CUI request from the DLNA device 1200. The remote control plug-in 1204 in turn notifies the DAE application 1206 of the reception of the CUI request through an onCUIRequest event function. The DAE application 1206 commands the remote control plug-in 1204 to receive the CUI from the IPTV applications server 1202 through a getCUI method. The DLNA functions 1203 use the stored capability information to receive the CUI from the IPTV applications server 1202. The subsequent process is performed in the same manner as illustrated in FIG. 12 and will not be described herein in detail.

FIG. 14 describes Application Programming Interfaces (APIs) and an interface according to an embodiment of the present invention, which are applicable to DAE SPEC of the Open IPTV Forum standard.

As to Property (Event), when a third RUIC requests a CUI for a DAE application being executed in an OITF, a remote control plug-in generates an onCUIRequest callback event function to the DAE application. A device handle value for the currently connected third RUIC is also sent as a parameter to the DAE application. Before the onCUIRequest callback event function is generated to the DAE application, the OITF stores capability information about the third RUIC received along with a CUI request from the third RUIC. The capability information is used when a getCUI method is called later to receive an appropriate CUI that can be rendered in the third RUIC from an IPTV applications server.

An onCompleteReceivingCUI callback event function is generated to the remote control plug-in by the DAE application. The onCompleteReceivingCUI callback event function requests a CUI download by a getCUI method. When a CUI is completely downloaded from the IPTV application server to the OITF and ready to be sent to the third RUIC, the remote control plug-in sends a prefix of a URI through which the downloaded CUI is accessible to the DAE application.

A parameter cuiPrefixURI sent along with the onCompleteReceivingCUI callback event function is expressed as a URI (e.g. /cui/playercontroller/001/) through which the third RUIC can access a directory having the downloaded CUI.

If the name of a CUI that the DAE application has is friends_cod_controller.html, a combination of cuiPrefixURI and the name of the CUI may be sent to the third RUIC (e.g. /cui/playercontroller/001/friends_cod_controller.html).

Regarding Method, there is a Boolean isRCExist method for, in the presence of the capability information about the third RUIC, sending the capability information to the remote control plug-in. If a value 'true' is returned, this means that the third RUIC is currently connected to the OITF and the capability information is successfully stored in the remote control plug-in of the OITF.

Otherwise, a value 'false' is returned to the DAE application (RUI).

In case of a getConnectedRemoteDeviceHandle method similar in function to the isRCExist method, when the DAE application calls it, it delivers an integer device handle value by which to adjust the connected third RUIC to the DAE application. In the absence of a connected third RUIC, an undefined value or a null value is returned.

The DAE application commands the remote control plug-in to download a CUI from the IPTV applications server through the getCUI method. The DAE application also sends a URL for downloading as a parameter to the remote control plug-in. Then the remote control plug-in sends to the IPTV applications server a download request message along with the capability information about the third RUIC, stored in the OITF.

The getCUImethod is asynchronous. When the DAE application calls the getCUI method, a value 'true' or 'false' indicating success or failure of the getCUI method execution is directly returned to the DAE application. That is, although the download is being performed between the remote control plug-in and the IPTV applications server, the DAE application can perform a process shortly after calling the getCUI method. Upon completion of the download between the remote control plug-in and the IPTV applications server, the afore-described onCompleteReceivingCUI event is sent to the DAE application.

When the DAE application sends to the remote control plug-in the device handle value specific to the third RUIC currently connected to the OITF along with the URI information by which a CUI is accessible by calling a sendCUI method, the remote control plug-in sends the URI information as a second parameter to the third RUIC identified by the device handle value as a first parameter. Thus the third RUIC can fetch the CUI from the OITF using the URI information.

HTTP uses an interface defined in the OITF DAE SPEC as an interface between the remote control plug-in and an RUIS and writes the capability information about the third RUIC at a location designated for writing capability information. Basically, other information about the third RUIC is also written together, such as vendorName, modelName, softwareVersion, hardwareVersion, applicationName, and applicationVersion.

If such information (i.e. vendorName, modelName, softwareVersion, hardwareVersion, applicationName, and applicationVersion of the third RUIC) cannot be sent together with the capability information about the third RUIC, for example, when the third RUIC has not sent the information about vendorName, modelName, softwareVersion, hardwareVersion, applicationName, and applicationVersion, this information may be replaced with information about the OITF. Because the information about vendorName, modelName, softwareVersion, hardwareVersion, applicationName, and applicationVersion of the third RUIC is optional, a field designed for the capability information and the other information about the third RUIC may carry only the capability information. Meanwhile, the other information about the third RUIC is marked with [ ] in the description of the interface between the remote control plug-in and the IPTV applications server in FIG. 14. [ ] means optional.

FIGS. 15A and 15B illustrate properties and methods for the APIs described in FIG. 14 according to an embodiment of the present invention, which are applicable to the specification of the Open IPTV Forum standard.

FIG. 16 describes interfaces and messages for implementing an IPTV service in an OITF by a third RUIC according to an embodiment of the present invention, which are applicable to the PROTOCOL specification of the Open IPTV Forum standard.

The protocol is required to send an RUI (an IPTV service) from an IPTV applications server to an OITF and to render the RUI in the OITF, through a third RUIC in the flowcharts of FIGS. 8 to 11.

FIG. 16 describes three steps. First, an HTTP request message is sent to an OITF through a CUI rendered in a third RUIC. Specifically, in Step 1, the HTTP request message may be sent through a URI set in a GET or POST method. In Step 2, the CUI waits until receiving a response to the HTTP request message. In Step 3, the OITF sends information about a URI of a new CUI to the third RUIC. The format of the HTTP response message is illustrated in Step 3 of FIG. 16. The URI information about the CUI is included in an HTTP Response Body.

FIG. 17 describes interfaces and messages for requesting a CUI to control a DAE application currently being executed in an OITF by a third RUIC according to an embodiment of the present invention, which are applicable to the PROTOCOL specification of the Open IPTV Forum standard.

FIG. 17 describes three steps. First, a third RUIC sends an HTTP request message requesting a CUI for controlling a DAE application currently being executed in an OITF through a CUI rendered in the third RUIC. Specifically, in Step 1, the HTTP request message may be sent through a URI set in a GET method. In Step 2, the CUI waits until receiving a response to the HTTP request message. In Step 3, the OITF sends information about a URI of the requested CUI to the third RUIC. The format of the HTTP response message is illustrated in Step 3 of FIG. 17. The URI information about the CUI is included in an HTTP Response Body.

As is apparent from the above description of the present invention, since a remote third device can receive a CUI matching the capability of the third device from an RUIS, the performance of a short-range network can be maximized.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A remote control method of an application execution device in a short-range network system, comprising:
    collecting, from a remote device that remotely controls the application execution device using a predetermined Control User Interface (CUI), information about capability of the remote device;
    sending a CUI request requesting a CUI to be used for remotely controlling a currently executed application and the information about the capability of the remote device to an application server;
    receiving a CUI matching the capability of the remote device from the application server in response to the CUI request; and
    sending the received CUI to the remote device.

2. The remote control method of claim 1, wherein the currently executed application is an application executed before the application execution device discovers the remote device.

3. The remote control method of claim 1, wherein the currently executed application is an application executed after the application execution device discovers the remote device.

4. The remote control method of claim 2, wherein the collection comprises receiving the information about the capability of the remote device along with a CUI request from the remote device.

5. The remote control method of claim 3, wherein the collection comprises receiving the information about the capability of the remote device along with a predetermined application service request from the remote device.

6. An application execution device for performing remote control in a short-range network system, comprising:
    a first entity for collecting, from a remote device that remotely controls the application execution device using a predetermined Control User Interface (CUI), information about capability of the remote device; and
    a second entity for sending a CUI request requesting a CUI to be used for remotely controlling a currently executed application and the information about the capability of the remote device to an application server, and receiving a CUI matching the capability of the remote device from the application server in response to the CUI request,
    wherein the first entity sends the CUI received from the second entity to the remote device.

7. The application execution device of claim 6, wherein the currently executed application is an application executed to generate the second entity, before the first entity discovers the remote device.

8. The application execution device of claim 6, wherein the currently executed application is an application executed to generate the second entity, after the first entity discovers the remote device.

9. The application execution device of claim 7, wherein the first entity receives the information about the capability of the remote device along with a CUI request from the remote device.

10. The application execution device of claim 8, wherein the first entity receives the information about the capability of the remote device along with a predetermined application service request from the remote device.

11. A method for remotely controlling an application execution device using a predetermined Control User Interface (CUI) in a remote device in a short-range network system, the method comprising:
    sending information about capability of the remote device to the application execution device;
    receiving a CUI matching the capability of the remote device from the application execution device; and
    remotely controlling an application being executed in the application device using the received CUI.

12. The method of claim 11, wherein the transmission comprises sending the information about the capability of the remote device to the application execution device, before the application execution device executes the application.

13. The method of claim 11, wherein the transmission comprises sending the information about the capability of the remote device to the application execution device, after the application execution device executes the application.

14. The method of claim 12, wherein the transmission comprises sending the information about the capability of the remote device along with a CUI request to the application execution device.

15. The method of claim 13, wherein the transmission comprises sending the information about the capability of the remote device along with a predetermined application service request to the application execution device.

16. A system for providing a Declarative Application Environment (DAE) application through remote control, comprising:
    an application server for providing a DAE application and a Control User Interface (CUI;
    a remote device for sending information about capability of the remote device after the remote device is connected to an application execution device, and receiving a CUI matching the capability of the remote device from the application execution device; and
    the application device for collecting the information about the capability of the remote device from the remote device, sending a CUI request requesting a CUI to be used for remotely controlling a currently executed application and the information about the capability of the remote device to the application server, and receiving the CUI matching the capability of the remote device from the application server in response to the CUI re quest.

17. The system of claim 16, wherein the application execution device comprises:
- a first entity for collecting the information about the capability of the remote device from the remote device that remotely controls the application execution device using a predetermined Control User Interface (CUI); and
- a second entity for sending the CUI request requesting a CUI to be used for remotely controlling a currently executed application and the information about the capability of the remote device to the application server, and receiving the CUI matching the capability of the remote device from the application server in response to the CUI request, wherein the first entity sends the CUI received from the second entity to the remote device.

18. The system of claim 17, wherein the currently executed application is an application executed to generate the second entity, before the first entity discovers the remote device.

19. The system of claim 17, wherein the currently executed application is an application executed to generate the second entity, after the first entity discovers the remote device.

20. The system of claim 18, wherein the first entity receives the information about the capability of the remote device along with a CUI request from the remote device.

21. The system of claim 19, wherein the first entity receives the information about the capability of the remote device along with a predetermined application service request from the remote device.

* * * * *